United States Patent [19]

Highsmith et al.

[11] Patent Number: 4,988,442
[45] Date of Patent: Jan. 29, 1991

[54] PROCESS FOR DEWATERING OF BIOLOGICAL SLUDGE

[75] Inventors: Ronald E. Highsmith, Skaneateles; Frederick J. Good, Jr., Camillus, both of N.Y.; Francis S. Lupton, Evanston, Ill.; Kenneth P. Kehrer, Lancaster, Pa.; Glenn E. Petrie, Bartlett, Ill.

[73] Assignee: Polypure, Inc., Solvay, N.Y.

[21] Appl. No.: 267,589

[22] Filed: Nov. 7, 1988

[51] Int. Cl.$^5$ ............................................. C02F 1/02
[52] U.S. Cl. .................................. 210/609; 210/732; 210/734; 210/737; 210/770; 210/774; 210/806
[58] Field of Search ............... 210/734, 737, 768, 770, 210/774, 787, 806, 732, 609; 494/37, 13

[56] References Cited

U.S. PATENT DOCUMENTS

| | | | |
|---|---|---|---|
| 3,398,093 | 8/1968 | Ferney | 210/737 |
| 3,414,514 | 12/1968 | Buhl | 210/734 |
| 4,154,910 | 5/1979 | Tanaka et al. | 526/303.1 |
| 4,256,630 | 3/1981 | Fremont | 210/737 |
| 4,289,625 | 9/1981 | Tarman et al. | 210/613 |
| 4,396,513 | 8/1983 | Haldeman | 210/734 |
| 4,479,879 | 10/1984 | Hashimoto et al. | 210/734 |
| 4,604,213 | 8/1986 | Fong et al. | 210/735 |
| 4,673,510 | 6/1987 | Janusch et al. | 210/737 |
| 4,713,178 | 12/1987 | Fong et al. | 210/734 |
| 4,810,393 | 3/1989 | Guinard | 210/737 |

FOREIGN PATENT DOCUMENTS

| | | |
|---|---|---|
| 1116765 | 1/1982 | Canada . |
| 1906158 | 1/1971 | Fed. Rep. of Germany . |
| 2327965 | 6/1977 | France . |
| 4617036 | 5/1971 | Japan . |

Primary Examiner—Richard V. Fisher
Assistant Examiner—Christopher Upton
Attorney, Agent, or Firm—Robert M. Phipps

[57] ABSTRACT

The present invention provides an improved biological sludge dewatering process. The process comprises the steps of: (a) heating biological sludge to a temperature of about 90° to about 150° C. which corresponds to a pressure of about 0 to about 55 psig and retaining the biological sludge at that temperature for less than about 15 minutes; (b) centrifuging the heated biological sludge to isolate the solids of the heated biological sludge from the liquid of the heated biological sludge; (c) chemically conditioning the isolated solids; and (d) dewatering the conditioned solids to produce a high solids biological sludge. The present process is used for dewatering any biological sludge to produce a high solids cake. The resulting high solids cake may be used as landfill, incinerated, or used as fertilizer by spreading on land and plowing said fertilizer into the soil.

15 Claims, 1 Drawing Sheet

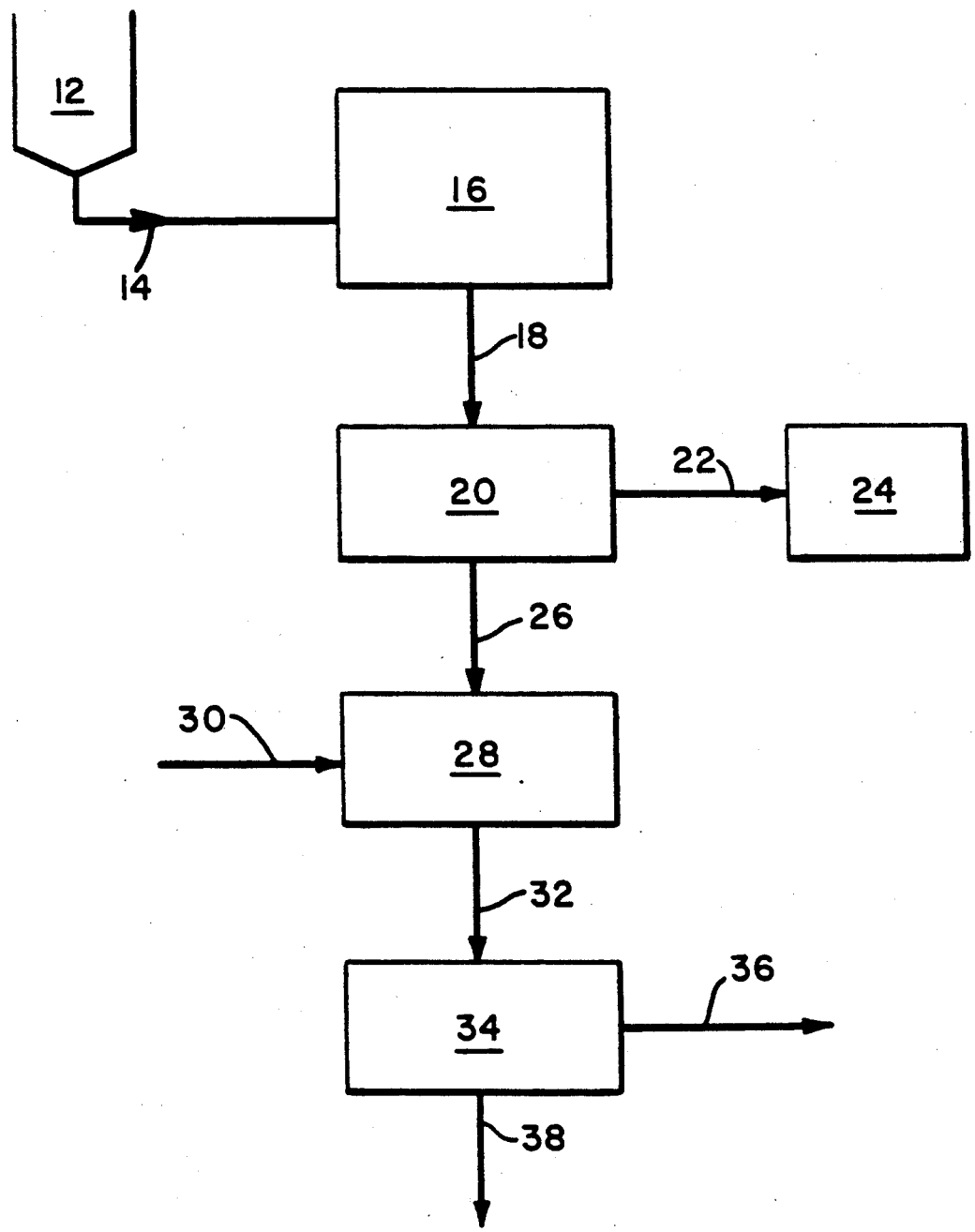

PROCESS FOR DEWATERING OF BIOLOGICAL SLUDGE

BACKGROUND OF INVENTION

The present invention relates to an improved process for the dewatering of biological sludge.

Biological sludges result from biological wastewater treatment processes such as the well-known Waste Activated Sludge Process or its modifications. Biological sludge is largely a mixture of bacteria and metabolic by-products which result from bacterial attack on the wastes in the wastewater; biological sludge also includes nondegradable or partially degraded materials.

Biological sludges are a significant disposal problem because they are extremely dilute, and hence, are generated in immense volumes on a daily basis by treatment plants. Because the volume of biological sludge generated is so high, the cost of transporting and disposal of the biological sludge is high. A primary goal of any biological sludge dewatering process is to minimize the volume. These sludges cannot be filtered directly, and therefore, filtration or other mechanical or gravitational means of sludge dewatering, such as disclosed by U.S. Pat. No. 2,850,449 are impractical without further treatment.

Thermal conditioning of biological sludge for purposes of dewatering was first reported in the early 1900's. The Porteous process, a basic thermal conditioning process, is disclosed in U.S. Pat. No. 2,075,224 and involves heat curing biological sludge at elevated temperatures and pressures in the absence of air. Thermal conditioning or heat treatment of biological sludges has been accepted, and therefore, widely practiced as a means for achieving good dewatering upon filtration; it has been reported that over 100 sludge heat treatment installation have been made in the United States alone. However, today only about five installations are still in operation because of high maintenance and operating costs partially resulting from the typical conditions required to achieve good filtration.

Typical operating procedures for thermal conditioning of biological sludge involve heating the biological sludge at temperatures of 150° to 240° C. in a reaction vessel under pressures of 250 to 400 psig or 15 to 90 minutes as taught by Everett, "Dewatering of Wastewater Sludge by Heat Treatment," *Journal WPCF* 44, 92(1972); Everett, "Recent Developments in Heat Treatment, " *Wat. Pollut. Control* 72, 428(1973); and *Process Design Manual for Sludge Treatment and Disposal*, EPA 1979. The sludge is then dewatered by conventional mechanical dewatering devices such as vacuum filters, centrifuges, belt filter presses, or plate and frame presses. The dewatering process frequently requires the addition of cationic polymer flocculants for high efficiency. Generally, the heat treatment of biological sludge and subsequent dewatering thereof provide cake solids of about 30–50%. It is well known in the prior art that chemical conditioning alone provides cake solids of only about 20%.

The problems with heat treatment of biological sludges are well-known in the art as reported by Haug et al., "Effect of Thermal Pretreatment on Digestibility and Dewaterability of Organic Sludges," *Journal WPCF* 50, 73(1978). One problem is the high maintenance cost as a result of corrosion caused by salt present in the sludge and operation at high temperatures and pressures. A related problem is the high capital equipment cost because expensive corrosion-resistant metals and rugged construction sufficient to meet the high temperature and pressure conditions are required. Another problem is the intense unpleasant odor associated with the hot biological sludge when it is released from the reaction vessel. The energy requirements are also high which is disadvantageous. Another problem is that the filtrate contains high Biological Oxygen Demand (B.O.D.) levels, usually on the order of 20,000 mg/l or higher, which result from the solubilization of the solids. As the heat treatment temperature increases, the amount of solids in the biological sludge decreases and the amount of dissolved B.O.D. in the filtrate increases; as such, the filtrate must be treated before the filtrate is discharged to the environment. This treatment cost is very high and is proportional to the B.O.D. level.

A need exists in the art for an improved biological sludge dewatering process wherein the disadvantages of current heat treatment processes are avoided and solids are provided in a higher percentage than when chemicals are used alone without heat treatment.

SUMMARY OF THE INVENTION

The present invention provides an improved biological sludge dewatering process. The process comprises the four steps of: (a) heating biological sludge to a temperature of about 90° to about 150° C. which corresponds to a pressure of about 0 to about 55 psig and retaining the sludge at that temperature for less than about 15 minutes; (b) centrifuging the heated biological sludge to isolate the solids of the heated biological sludge from the liquid of the heated biological sludge; (c) chemically conditioning the isolated solids; and (d) dewatering the conditioned solids to produce a high solids sludge. The term "high solids" as used herein means greater than about 20% solids.

The present process provides solids percentages comparable to that of current heat treatment processes while avoiding the corrosion problems, high capital equipment cost, odor, and high energy requirements which accompany the current heat treatment processes. Another advantage of the present process compared to current heat treatment processes is that the present process provides a filtrate with a lower B.O.D., i.e., about 1,500 to about 2,000 mg/l; the current heat treatment processes provide filtrates having B.O.D. levels of about 20,000 mg/l for sludge of approximately the same composition.

The main advantage of the present process compared to current chemical conditioning processes is that the present process provides greater than 20% solids, while chemical conditioning processes alone provide only about 20% solids when using conventional mechanical dewatering devices. Any increase in solids represents a significant savings in transportation and disposal costs.

As such, the present invention fulfills the need in the art for an improved biological sludge dewatering process wherein the disadvantages of current heat treatment processes are avoided and solids are provided in a higher percentage than in current chemical dewatering processes.

Other objects and advantages of the present invention will become apparent from the following description, attached drawing and appended claims.

BRIEF DESCRIPTION OF THE DRAWING

The FIGURE is a schematic illustration of the present process.

DETAILED DESCRIPTION OF THE PREFERRED EMBODIMENTS

The present process is useful for dewatering any biological sludge to a high cake solids. Illustrative examples of biological sludges include primary sludge, waste activated sludge, extended aeration sludge, anaerobic digested sludge, related sludges resulting from bacterial-based wastewater treatment, and mixtures thereof.

Referring to the FIGURE, biological sludge is transported from holding tank 12 in the direction of arrow 14 to reaction vessel 16. In step (a) of the present process, the biological sludge in reaction vessel 16 is heated to a temperature of about 90° to about 150° C. which corresponds to a pressure of about 0 to about 55 psig and is retained at that temperature for less than about 15 minutes. Preferably, the biological sludge is heated to a temperature of about 90° to about 125° C. In one preferred embodiment, the biological sludge is heated to a temperature of about 90° to about 99° C. while in another preferred embodiment, the biological sludge is heated to a temperature of about 100° to about 125° C.

The rate of heating of the biological sludge to the foregoing temperature may be determined by best engineering practice. Preferably, the biological sludge is heated to the aforementioned temperature as rapidly as possible. The retention time is preferably about 0 to about 15 minutes, and more preferably, about 0 to about 10 minutes. Thus, the retention time used is the minimum time required to allow the biological sludge to come to a uniform temperature. Compared to current heat treating processes, a shorter retention time is advantageous because it reduces the size of the reaction vessel required and results in lower B.O.D. in the filtrate.

Because this process uses lower temperatures and pressures than prior art heat treatment processes, reaction vessel 16 may be constructed from less expensive metals and with less rugged construction. After heating, the biological sludge is then transported in the direction of arrow 18 to centrifuge 20.

In step (b) of the present process, the heated biological sludge from step (a) is centrifuged to isolate the solids of the heated biological sludge from the liquid of the heated biological sludge. A conventional solid bowl decanter centrifuge is preferably used for this purpose. Because the benefits derived from this centrifugal isolation step are proportional to the separation degree of liquid and solids, the separation degree preferably ranges from about 1 to about 99% of the original biological sludge volume. More preferably, the separation degree of liquid from the solids is about 30 to about 80% based on the original biological sludge volume.

After step (b), the separated water is transported from centrifuge 20 in the direction of arrow 22 to tank 24. The removed water typically has a B.O.D. of about 1,500 to about 2,000 mg/l which is significantly lower than the B.O.D. level of current heat treatment processes.

The isolated solids are transported in the direction of arrow 26 to chemical conditioning tank 28.

In step (c) of the present process, the isolated solids are chemically conditioned. Preferably, the isolated solids are chemically conditioned with a polymer solution which is fed in the direction of arrow 30 into tank 28. Preferably, a synthetic cationic polymer is used. More preferably, the synthetic cationic polymer used has an intrinsic viscosity of about 3 to about 30 deciliters/gram in 1N sodium nitrate at 30° C. and a cationic charge of about 20 to about 50 mole %. A preferred polymer is a copolymer of the cationic monomer, methacryloyloxytrimethylammonium chloride, and acrylamide. The conditioned solids are transported in the direction of arrow 32 to dewatering device 34.

In step (d) of the present process, the conditioned solids are dewatered to produce greater than 20% solids which is higher than the percent solids produced by current chemical conditioning processes. Any conventional mechanical dewatering device such as a belt filter press, vacuum drum filter, or plate and frame press may be used for this purpose.

After step (d), the separated water is transported from dewatering device 34 in the direction of arrow 36 usually for recycle back into the biological treatment process.

After step (d), the high cake solids are then transported from dewatering device 34 in the direction of arrow 38. The dry cake solids may be disposed of in a landfill. For such disposal, the transportation and landfill cost are greatly reduced because of the increased cake solids The sludge cake may also be incinerated; in such an application, the higher cake solids are advantageous because less fuel is required.

The present invention is more fully illustrated by the following non-limiting Examples.

GENERAL EXPERIMENTAL CONDITIONS

In the following Examples, certain general conditions are employed for all Examples and are best described here.

Heating of the biological sludge was accomplished using a small electrically heated autoclave. Unless noted otherwise, approximately 1,200 grams of sludge were treated in the autoclave to the desired temperature, typically 121° C., which usually required 25 minutes because of the limitations of the laboratory autoclave. The biological sludge was held at that temperature usually for 10 minutes to insure uniform temperature. By the time the sample could be removed from the autoclave, the temperature had dropped to about 95° C.

Separation of sludge was accomplished by immediately transferring the sludge into each of six 250 mL flat bottomed tubes suitable for use in a Sorvall RC5C centrifuge. The centrifuge was operated at 1000 x g for 2 minutes. The temperature after centrifugation was on the order of 60° C. Typically, 800 grams of supernatant were decanted from an original sample of 1,200 grams of 2% sludge. The solids remaining in the tubes were resuspended with an equal volume of tap water for purpose of comparison to other samples and to facilitate mixing of the polymer. In commercial practice, it may or may not be necessary to disperse the solids depending on the capability of commercially sized equipment to handle slurries of sludge solids and/or the degree of separation.

For purposes of determining the optimum polymer dose, the redispersed sludge was divided into fractions with each fraction receiving a different measured volume of cationic polymer solution.

Typically, 0 to 40 mL of 0.18% cationic polymer solution was added to 200 mL of sludge. The cationic polymer used in all Examples was C-310, a quaternary copolymer of methacryloyloxytrimethylammonium chloride and acrylamide supplied by Allied-Signal, Inc. Once introduced, the polymer was vigorously mixed with the solids for one minute. Its concentration is expressed in ppm of 100% polymer per gram of liquid sludge.

Dewatering of the conditioned sludge was accomplished by a technique known as the Buchner funnel test. A known volume of the polymer-conditioned sludge was poured onto the center of the Buchner funnel and the filtrate was allowed to drain away leaving the sludge solids retained on the filter. After a minute or two, a disk of impervious rigid plastic, slightly smaller than the inside diameter of the filter, was placed on top of the sludge solids. Then a very thin piece of latex rubber was laid over the filter in such a manner that when a vacuum is drawn on the filter, the pressure was then distributed uniformly to the sludge cake. This procedure is necessary in order to establish reproducible results. Vacuum was applied for 4 minutes. Then the cake was removed, weighed wet, dried in an oven at 103° C., and then weighed. The percent cake solids was calculated according to: % Cake Solids=(dry cake weight/wet cake weight) (100%).

One of the objectives of the experimental work described herein was to demonstrate that the specific steps and their sequence defined a unique invention not previously reported. During the course of the experimental work, it was observed that the sludge could not be flocculated by chemicals if it was heated and not subjected to the separation step previously described. The sludge could not be properly filtered if it was not flocculated. This is clearly in contrast to the prior art which shows that at higher temperatures and pressure, heat treated sludge could be filtered with or without chemical aids.

EXAMPLE 1

This Example illustrates the effect of heat and/or centrifugation in the present process.

A sample of anaerobic digested sludge (2.0% solids) from the metropolitan sewage treatment plant in Syracuse, N.Y. was divided into four aliquots. Aliquot A received heat treatment and centrifugal separation as described above. Aliquot B received heat treatment but no separation. Aliquot C as subjected to separation but received no heat treatment. Aliquot D received neither heat treatment or separation. Heat treatment was at 121° C. for 10 minutes. After separation, the solids were resuspended in tap water as described above so that all samples had approximately the same concentration of suspended solids for purposes of comparison. Equal portions of cationic polymer (180 ppm) were added to each aliquot, mixed thoroughly for 1 minute, and dewatered using the Buchner funnel. The results are in Table I below.

TABLE I

| | TREATMENT | | | | |
|---|---|---|---|---|---|
| Aliquot | Heat | Separation | Polymer | Dewatering | % Cake Solid |
| A | Yes | Yes | Yes | Yes | 24 |
| B | Yes | No | Yes | would not filter | — |
| C | No | Yes | Yes | Yes | 18 |
| D | No | No | Yes | Yes | 14 |

These results show that superior dewatering is achieved with heat and separation. Furthermore, it is shown that heat and separation in sequence are necessary.

EXAMPLE 2

This Example illustrates the use of a mixture of waste activated and primary sludge.

A mixture of waste activated and primary sludge (1.8% solids) from the metropolitan sewage treatment plant in Syracuse, N.Y. was used. A sample was divided into four aliquots: Aliquot A received both heat treatment and separation, Aliquot B received heat treatment but no separation, Aliquot C was subjected to separation but received no heat treatment, and Aliquot D received neither heat or separation. All heat treatment was at 121° C. for 10 minutes. The aliquots were mixed with 103 ppm of cationic polymer for 1 minute and then dewatered on the Buchner funnel as described above. The results are in Table II below.

TABLE II

| | TREATMENT | | | | |
|---|---|---|---|---|---|
| Aliquot | Heat | Separation | Polymer | Dewatering | % Cake Solid |
| A | Yes | Yes | Yes | Yes | 26 |
| B | Yes | No | Yes | would not filter | — |
| C | No | Yes | Yes | Yes | 18 |
| D | No | No | Yes | Yes | 18 |

These results show again that both heat and separation are necessary for obtaining the highest cake solids and that the process applies to another type of sludge, mixed waste activated and primary.

EXAMPLE 3

This example illustrates that the typical centrate BOD from this process is significantly lower than the BOD from current heat treatment processes.

Approximately 1200 grams of anaerobic digested sludge (2.8% solids), obtained from the Metropolitan Sewage Treatment Plant in Syracuse, N.Y., received heat treatment (121° C. for 10 minutes) and separation as previously described. The centrate was subjected to further centrifugation to remove any suspended matter prior to measurement of BOD. Two identical samples were analyzed for BOD. The results are presented below:

| Sample | BOD-5-day (mg/L) |
|---|---|
| 1 | 1900 |
| 2 | 1700 |
| Average | 1800 |

The 1800 mg/L BOD from this process is much lower than the 20,000 mg/L BOD usually found using current heat treatment processes.

EXAMPLE 4

The example illustrates that centrate BOD is also low when using a mixture of waste activated and primary sludge.

A mixture of waste activated and primary sludge (0.6% solids) was obtained from the Metropolitan Sewage Treatment plant in Syracuse, N.Y. The sludge received heat treatment at 121° C. for 10 minutes and separation as described above. The separated centrate had a BOD-5-day of 773 mg/L, which again is much lower than current heat treatment processes.

Having described the invention in detail and by reference to preferred embodiments thereof, it will be apparent that modifications and variations are possible without departing from the scope of the invention defined in the appended claims.

What is claimed is:

1. A dewatering process consisting essentially of the steps
    (a) heating biological sludge to a temperature of about 90° to about 150° C. which corresponds to pressure of about 0 to about 55 psig and retaining said biological sludge at said temperature for less than about 15 minutes;
    (b) centrifuging said heated biological sludge to isolate the solids of said heated biological sludge from the liquid of said heated biological sludge:
    (c) chemically conditioning said isolated solids with a polymer solution; and
    (d) dewatering said conditioned solids to produce a high solids sludge.

2. The dewatering process of claim 1 wherein said biological sludge is an anaerobic digested sludge.

3. The dewatering process of claim 1 wherein said biological sludge is a mixture of waste activated and primary sludges.

4. The dewatering process of claim 1 wherein . in said step (a), said biological sludge is heated to a temperature of about 90° to about 125° C.

5. The dewatering process of claim 1 wherein in said step (a). said biological sludge is heated to a temperature of about 90° to about 99° C.

6. The dewatering process of claim 1 wherein in said step (a), said biological sludge is heated to a temperature of about 100° to about 125° C.

7. The dewatering process of claim 1 wherein in said step (a), said biological sludge is retained at said temperature for about 0 to about 10 minutes.

8. The dewatering process of claim 1 wherein in said step (b), said heated biological sludge is centrifuged with a solid bowl decanter centrifuge.

9. The dewatering process of claim 1 wherein based on the biological sludge volume, about 1 to about 99% liquid is isolated in said step (b).

10. The dewatering process of claim 1 wherein based on the biological sludge volume, about 30 to about 80% liquid is isolated in said step (b).

11. The dewatering process of claim 1 wherein in said step (b), said water has a Biological Oxygen Demand of about 1,500 to about 2,000 mg/l.

12. The dewatering process of claim 1 wherein in said step (c), said isolated solids are conditioned with a cationic polymer.

13. The dewatering process of claim 12 wherein in said step (c), said cationic polymer has an intrinsic viscosity of about 3 to about 30 deciliters/gram in 1N sodium nitrate at 30° C. and a cationic charge of about 20 to about 50 mole %.

14. The dewatering process of claim 12 wherein in said step (c), said cationic polymer is a copolymer of methacryloyloxytrimethylammonium chloride and acrylamide.

15. The dewatering process of claim 1 wherein in said step (d), said conditioned solids are dewatered by filtering.

* * * * *

Disclaimer 4,988,442 — Ronald E. Highsmith, Skaneateles; Frederick J. Good, Jr., Camillus, both of N.Y.; Francis S. Lupton, Evanston, Ill.; Kenneth P. Kehrer, Lancaster, Pa.; Glenn E. Petrie, Bartlett, Ill. PROCESS FOR DEWATERING OF BIOLOGICAL SLUDGE. Patent dated Jan. 29, 1991. Disclaimer filed March 10, 1997, by the assignee, S.N.F.

Hereby enters this disclaimer to all claims of said patent.
*(Official Gazette,* April 29, 1997)